(No Model.)
H. S. BLACKMORE.
PERCOLATOR.
No. 466,152.  Patented Dec. 29, 1891.
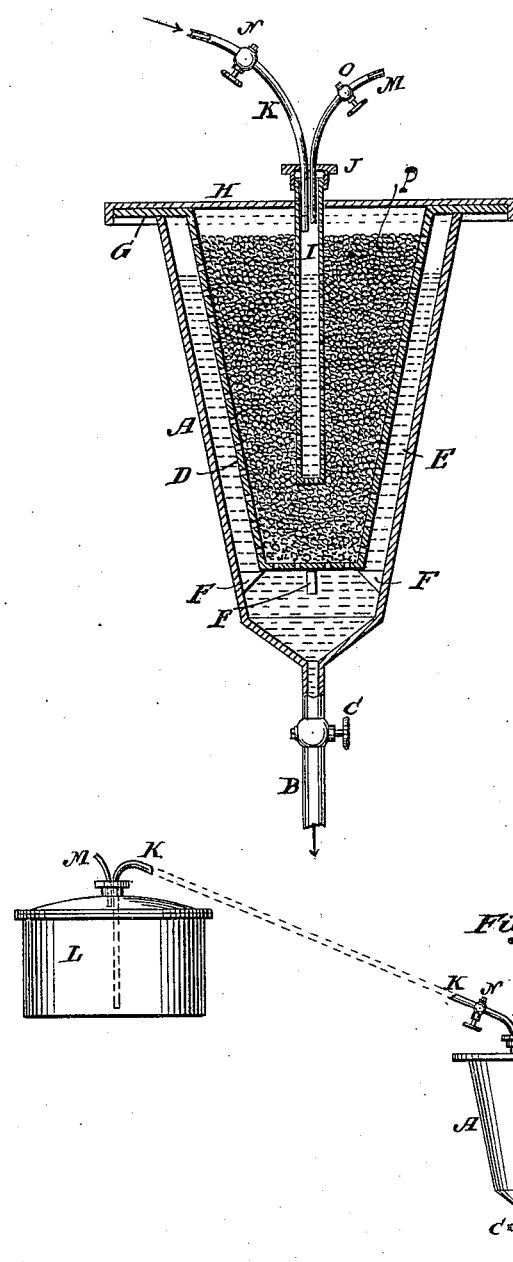
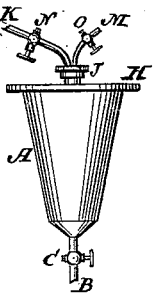
WITNESSES:
Edward Wolff.
William Miller
INVENTOR:
Henry S. Blackmore.
BY
Van Santvoord & Stauff
ATTORNEYS

UNITED STATES PATENT OFFICE.

HENRY S. BLACKMORE, OF MOUNT VERNON, NEW YORK.

PERCOLATOR.

SPECIFICATION forming part of Letters Patent No. 466,152, dated December 29, 1891.

Application filed July 16, 1891. Serial No. 399,711. (No model.)

*To all whom it may concern:*

Be it known that I, HENRY S. BLACKMORE, a citizen of the United States, residing at Mount Vernon, in the county of Westchester and State of New York, have invented new and useful Improvements in Percolators, of which the following is a specification.

This invention relates to percolators and similar articles for extracting the active principals of drugs or other materials or for producing saturated solutions of various substances—such, for example, as sugar for sirups, gummy substances, &c.; and it consists in various novel features described in the following specification and claims, reference being had to the accompanying drawings, in which—

Figure 1 is a vertical central section of the apparatus; and Fig. 2 is an elevation of the percolator, showing its connection with a vessel containing the menstruum employed in the extraction.

My improved apparatus is so constructed as to combine in one operation two of the foremost principles in the production of solutions—namely, simple percolation and circulatory displacement—thereby obtaining a uniformly-saturated solution or percolate in a shorter time and with less labor and of greater strength than are customary with the apparatus employed hitherto and with decreased loss from evaporation.

In carrying out my invention I provide a vessel A, of glass, porcelain, or other suitable material, which is by preference made of funnel shape, and which terminates at the bottom in a discharge-pipe B, that can be closed by a stop-cock C. Within the vessel A is placed a vessel or receptacle D, of less diameter than vessel A, so that a space E is formed or left between them. The receptacle D holds the drug or article to be treated. The walls of the receptacle D are perforated with fine holes throughout, which will allow the menstruum and solution or percolate to pass through them, or the receptacle D may be composed of porous material of suitable character, which will allow the passage of liquid through its walls. The receptacle D is supported in the vessel A upon lugs F F F, that project inward from the walls of vessel A, and the top of said receptacle D is provided with a flange G, which extends over and rests upon the upper edge of the vessel A and closes the annular space E. The apparatus is provided with a cover H, which closes the receptacle D and fits over its flange G, so as to exclude the air. Through the cover H there extends downward into the receptacle D a tube I, whose walls are perforated, or else the tube itself is made of porous material, so as to allow liquids to pass through. The bottom of the tube is also perforated or is made of porous material. The top of the tube I projects upward above the cover H and is provided with a suitable stopper J, which is perforated to allow the passage through it of two pipes, one of which K extends thence to the bottom of the vessel L, that contains the menstruum, and the other M extends to the same vessel, but only enters its top. The connections of the said pipes with the cover of the percolator and the vessel L are air-tight. The pipes K and M are provided with stop-cocks N O between the percolator and the vessel that supplies the menstruum.

In operating the apparatus the drug or material to be treated is placed in the perforated receptacle D, and the lower part of the mass—say up to about the level of the bottom of tube I—is packed more or less closely, according to the nature of the material, care being taken that it be not packed too solidly to prevent the menstruum from percolating through it. The receptacle D is then filled nearly to its top with the drug P and the stop-cocks and vessels of the apparatus are adjusted so that the menstruum contained in the vessel L will be siphoned off from it into the percolating apparatus, being conducted through the pipe *k* into the tube I, whence it will pass through the walls of that tube into the mass P of the drug and through the same into the space E, and thence into the lower part of vessel A. As soon as the current of the siphon is established the stop-cocks C and O are closed, and as the menstruum from vessel L is transferred to the percolator the air in percolator passes through pipe M over into the vessel L.

It will be observed that by my apparatus the menstruum is introduced into the percolating apparatus at the center of the drug and out of direct contact with the air. The percolate becomes thoroughly saturated by circulatory displacement, since that portion of the menstruum which contains the larger percentage of dissolved ingredients, and is therefore of greater specific gravity than other portions, naturally sinks to the lower part of the apparatus, while the less saturated or lighter portions rise with facility toward the top of the apparatus through the free annular space E, which surrounds the receptacle D of the drug, and receive additional saturation from the drug, and thereby become stronger and denser and gradually settle and mix with the heavy liquid which had previously descended, thus producing a uniformly-saturated solution or extract. The extraction or solution obtained is drawn off through the discharge-pipe B.

When the active principal of the drug or material P under treatment has been dissolved out, the cover H of the apparatus is removed along with the tube I, leaving the receptacle D exposed and accessible so that it can be readily lifted by its flange G out of the vessel A and emptied of the spent drug or material which had been acted upon. In case the apparatus is of great size, so that the receptacle D cannot be moved by hand, mechanical appliances or tackle can be used in handling it by means of the flange G.

What I claim as new, and desire to secure by Letters Patent, is—

1. A percolator consisting of the vessel A, the perforated or porous receptacle D, supported therein and separated therefrom by a surrounding space E, the cover H, fitted to the upper end of the vessel and having a central orifice, the tube I, extending through the orifice in the cover and projecting into the perforated or porous receptacle, and the stopper J, secured to the upper end of the tube above the cover of the vessel and having orifices for the passage of the pipes K M, substantially as described.

2. In percolators, the vessel A, provided with a discharge-pipe and stop-cock, the perforated or porous receptacle D, separated from the vessel A by a space E, the perforated or porous tube I, the cover H, the menstruum-reservoir L, and the pipes K M, connecting the same with the percolator and the stop-cocks N O, substantially as shown and described.

In testimony whereof I have hereunto set my hand in the presence of two subscribing witnesses.

HENRY S. BLACKMORE.

Witnesses:
J. VAN SANTVOORD,
E. F. KASTENHUBER.